United States Patent [19]

den Boer et al.

[11] Patent Number: 4,667,189

[45] Date of Patent: May 19, 1987

[54] PROGRAMMABLE SEMICONDUCTOR SWITCH FOR A DISPLAY MATRIX OR THE LIKE AND METHOD FOR MAKING SAME

[75] Inventors: Willem den Boer, Troy; J. Scott Payson, Pleasant Ridge, both of Mich.; Zvi Yaniv, Beer-Sheva, Israel

[73] Assignee: Energy Conversion Devices, Inc., Troy, Mich.

[21] Appl. No.: 603,852

[22] Filed: Apr. 25, 1984

[51] Int. Cl.$^4$ .............................................. G09G 3/20
[52] U.S. Cl. .................................... 340/713; 340/718; 340/752; 340/811
[58] Field of Search ............... 340/713, 714, 752, 811, 340/813, 718, 719

[56] References Cited

U.S. PATENT DOCUMENTS

| | | | |
|---|---|---|---|
| 3,654,606 | 4/1972 | Marlowe et al. | |
| 4,103,297 | 7/1978 | McGreivy et al. | 340/719 |
| 4,233,603 | 11/1980 | Castleberry | 340/718 |
| 4,467,325 | 8/1984 | Lustig | 340/719 |

FOREIGN PATENT DOCUMENTS

| | | | |
|---|---|---|---|
| 2929010 | 3/1980 | Fed. Rep. of Germany | 340/811 |
| 2050031 | 12/1980 | United Kingdom . | |
| 2091468 | 7/1982 | United Kingdom . | |

OTHER PUBLICATIONS

Baraff, et al., "The Optimization of Metal–Insulator–Metal Nonlinear Devices for Use in Multiplexed Liquid Crystal Displays," *IEEE Transactions on Electron Devices*, vol. ED-28, No. 6, Jun. 1981, pp. 736–739.
D. R. Baraff, et al., "A 68 Line Multiplexed Liquid Crystal Display Using Metal–Insulator–Metal (MIM) Devices," *Bell–Northern Research*, 1980.
W. den Boer, "Alternating Space-Charge-Limited Currents in Hydrogenated Amorphous Silicon," *Solid State Communications*, vol. 45, No. 10, 1983, pp. 881–884.
W. den Boer, "Transient Currents in a-Si:H n+–i–n+ Devices," *Department of Electrical Engineering*, Delft University of Technology.
D. G. Ast, *Proceedings 1982 International Display Research Conference*, pp. 152–155.

*Primary Examiner*—Gerald L. Brigance
*Attorney, Agent, or Firm*—T. Ziegler; R. Nolan; M. Siskind

[57] ABSTRACT

A semiconductor switch having symmetrical, nonlinear current-voltage characteristics has a threshold value which is programmed using a light beam after assembly of the switch. The switch preferably comprises an n+-i-n+ device where the intrinsic material is an amorphous semiconductor alloy such as amorphous, hydrogenated or fluorinated silicon having a density and energy distribution of localized defect states in the band gap thereof forming deep traps which affect the threshold value. The highly doped n+ layers function to inject electrons into the intrinsic material and block the migration of holes. The device exhibits space charge limited current conduction and thus, increased nonlinearity under AC excitation. The switch may be employed in addressing display elements such as liquid crystal pixels in order to increase the rise time of pixel response and isolate the pixels from cross-talk, noise or other spurious signals. The n+-i-n+ device is deposited on a glass substrate along with electrodes and address lines required for switching the pixels. Following deposition, the threshold voltage of the device is programmed by directing a light beam through a partially transparent metal contact covering the n+-i-n+ material sandwich. The programming may be performed near the end of the fabrication process by directing the light beam through the glass plate on which the device is deposited. Following threshold programming, the device is sealed against further exposure to ambient radiation which might subsequently alter the threshold voltage.

34 Claims, 10 Drawing Figures

PROGRAMMABLE SEMICONDUCTOR SWITCH FOR A DISPLAY MATRIX OR THE LIKE AND METHOD FOR MAKING SAME

FIELD OF THE INVENTION

The present invention broadly relates to semiconductor switching devices and displays, and deals more particularly with a semiconductor switch having a programmable threshold voltage as well as a display having a matrix array of addressable pixels which are electrically isolated by programmable semiconductor switches. The invention also embraces methods for making the programmable switch and the display, and the products produced thereby.

BACKGROUND OF THE INVENTION

Nonlinear semiconductor switches such as diodes and the like are employed in various electronic control applications where it is necessary to switch current flow in response to a prescribed level of voltage. One such application involves visual display devices which employ a matrix of electrically energizable pixels (picture elements). The pixels may consist, for example, of well known liquid crystal elements in which a film or cell of liquid crystal material is positioned between a pair of electrodes. The liquid crystal material has the structural characteristics of cybotatic liquids but is considerably more viscous and exhibits much more evidence of structure. Smectic and nematic type liquid crystals, which are commonly used in displays, consist of elongate molecules whose longitudinal axes are rotated when an electric field of prescribed magnitude is applied to the material. The molecular rotation either blocks or allows transmission of light through the liquid crystal material, thereby altering its optical properties.

One common type of liquid crystal display employs twisted nematic crystals sandwiched between a pair of parallel glass sheets and a pair of polarizers respectively on opposite sides of the glass sheets. The glass sheets have parallel lines formed by etching or the like on the opposing faces thereof. The molecules of the nematic crystal material near the surface of each glass plate tend to align their long axes parallel to the lines on the glass plates. The plates are oriented relative to each other such that the two sets of lines are non-parallel, e.g. 90 degrees off axis, thus giving the nematic crystals a helical or twisted orientation which prevents the transmission of light through the cell. Application of an electric field across the cell rotates or "untwists" the molecules so that their axes extend substantially parallel to each other, thus allowing passage of light through the cell.

In order to display changeable data using liquid crystal displays, the pixels are arranged into M rows and N columns defining a matrix array that is addressed using conventional "X-Y" addressing techniques which employ M+N address lines. Each pixel possesses a unique X-Y location in the matrix which may be addressed by a corresponding combination of X and Y addressing lines.

The magnitude of the "threshold" voltage at which a liquid crystal pixel is switched to a different optical state is relatively low. In the case of matrix arrays where the pixels are closely spaced, a significant level of electrical cross talk exists in the addressing circuitry between adjacent pixels. Cross-talk having a signal strength as low as one-third of the pixel threshold voltage may be sufficient in some cases to energize pixels which are not intended to be addressed, consequently it is necessary to provide means for isolating each pixel to some degree from circuit cross-talk, thereby improving the electrical isolation between adjacent pixels. To achieve isolation in the past, nonlinear devices such as diodes have been placed in series with the liquid crystal pixels to increase the effective threshold of the pixels and thereby block stray currents emanating from addressed pixels from energizing adjacent, non-addressed pixels.

Addressing circuitry is complicated by the fact that an applied electric field of one sustained polarity (D.C.) results in electrolytic degradation of the liquid crystal material. Accordingly, it is necessary to periodically reverse the polarity of the applied field using conventional switching techniques. Polarity reversal is usually effected for each frame of the display, i.e. each time the matrix is scanned. One typical circuit for providing AC excitation of a liquid crystal display matrix is shown in U.S. Pat. No. 3,654,606 issued Apr. 4, 1972 to Marlowe, et al; a pair of X or Y address lines per pixel are employed, one of positive polarity and the other of negative polarity, and an AC signal is applied to a third address line. Each pixel is connected to the pair of address lines through associated reversed biased, blocking diodes.

The use of conventional diodes as isolating devices for pixel addressing has been less than completely satisfactory for several reasons. First, it is not always possible to control or select the threshold voltage at which the diode commences to conduct current when forward biased, and in any event, variations may exist in the threshold voltge of the diodes used in a single matrix. For a given level of addrress signal voltage, some of the forward biased diodes may conduct while others having a higher threshold voltage may not conduct or may conduct at a different rate. Accordingly, it is necessary to assure that a relatively high level address signal is applied to address the pixels.

It is also desirable to minimize the rise time of the current applied to each pixel in order to quickly switch the pixel after it has been addressed. The current-voltage characteristics of diodes previously employed for pixel isolation are such that the rise time of the current conducted by the diode following the application of threshold voltage is slower than desired.

SUMMARY OF THE INVENTION

According to one broad aspect of the invention, a semiconductor switch is provided having substantially symmetrical, highly nonlinear current-voltage characteristics and an adjustable threshold voltage. The switch includes sandwiched layers of semiconductor materials including an amorphous semiconductor alloy, such as hydrogenated or fluorinated amorphous silicon, having a wide band gap with deep traps. The deep traps determine the value of the threshold voltage and are due to an energy distribution and density of localized defect states in the energy band gap of the amorphous semiconductor alloy. Means contacting the wide band gap amorphous semiconductor material are provided for injecting electrons into the amorphous material, and act as a barrier to the migration of holes. The switch exhibits space charge-limited current flow and sharply nonlinear characteristics under excitation by an AC voltage which has a frequency exceeding that of the release rate of carriers from the deep traps. The increase in nonlinearity under AC excitation results from the remaining space charge in the deep traps which acts as a potential barrier and shift the onset of high current flow to well defined and higher voltage levels in comparison to DC excitation.

The switch preferably comprises a sandwich of $n^+$-i-$n^+$ amorphous semiconductor materials, in which the intrinsic layer is the wide band gap amorphous material having a high density of states and the highly doped $n^+$ layers act as ohmic contacts for injecting electrons into the i layer. The density of states of the i material may be increased by exposure thereof to light having photon energies about equal to or greater than the band gap of the i material so as to be absorbed by the i material, consequently the i layer is radiation sensitive.

The i material is pre-exposed to a certain amount of light radiation in order to preprogram the threshold voltage of the switch. An opaque shield surrounding the i material prevents subsequent alteration of the threshold voltage due to ambient light.

The switch is fabricated by forming a sandwich of material layers including a radiation sensitive amorphous semiconductor alloy which is responsive upon exposure thereof to radiation having photon energies about equal to or greater than the optical band gap for changing the number and energy distribution of localized defect states in the i material, e.g. 1.75 to 2.2 eV for amorphous silicon, which in turn alters the threshold voltage of the switch. The threshold voltage is adjusted to a preselected or "programmed" value by exposing the radiation sensitive, amorphous semiconductor alloy to the radiation for a selected duration of time. The threshold voltage of the switch is fixed at the programmed value by sealing the radiation sensitive layer against further radiation exposure from ambient radiation sources.

According to another aspect of the present invention, a method of fabricating a display having a matrix of addressable pixels is provided which comprises the steps of: forming a plurality of electrically energizable pixels each having an addressable electrode; forming a plurality of electrical address lines for addressing the pixels; forming a plurality of semiconductor switches respectively between the electrodes and the address lines for electrically isolating the pixels from signals below a prescribed voltage level, wherein the switches have symmetrical nonlinear current-voltage characteristics and include a radiation-sensitive semiconductor material which changes the threshold voltage of the device upon exposure of the material to radiation having at least a prescribed range of photon energies; adjusting the threshold voltage of the device to the prescribed value by exposing the material to radiation; and, fixing the threshold voltage at the prescribed value.

The pixels comprise a pair of electrodes respectively deposited on transparent glass plates between which there is sandwiched a layer of liquid crystal material. The isolating switches used in one form of the display employing a reflective surface behind the liquid crystals, are produced by first depositing a transparent conductive oxide pad on the face of one glass plate followed by the application of a film of metal such as chromium which is sufficiently thin to allow radiation to pass therethrough. A sandwich of $n^+$-i-$n^+$ hydrogenated or fluorinated amorphous silicon is then deposited on the surface of the thin metal film, following which a protective layer of metal such as molybdenum tantalum is deposited over the $n^+$-i-$n^+$ layers.

The resulting sandwich of materials is etched to form the body of the switch following which the device body is covered with a layer of insulating oxide such as $SiO_2$ and a layer of opaque passivation such as black polyimide. The i layer may be annealed by subjecting the sandwich to a temperature of 220° C. for a prescribed period, or by depositing the opaque passivation at such temperature. Annealing of the i layer reduces the density of defect states or traps therein and thus reduces the threshold voltage value in preparation for later programming. Vias are then cut in the insulating oxide as by etching, following which the address lines and pixel electrodes are formed by vapor deposition of either a suitable reflective metal such as aluminum or a transparent conductive oxide.

The threshold voltage of the isolating switches is adjusted either before or after the final metal disposition step by directing a beam of light of suitable wavelength and intensity through the glass plate and into the i layer of the isolation switches. The threshold voltage of the switches may be measured during irradiation, and the irradiation is terminated when the desired threshold is reached. The threshold voltage of the device is fixed at the programmed level by applying an opaque coating of CdTe or the like on the back of the glass plate, thereby sealing the device from the effects of further stray or ambient radiation.

In another embodiment of the programmable switch and related method for making same, the device comprises a sandwich of material layers which allows programming the threshold voltage through the use of a beam of radiation which is directed through the top of the switch, rather than through the back of the glass plate on which the device is deposited.

A further embodiment of the programmable switch and method of making same may be employed to provide transmission-type liquid crystal displays in which the field-applying electrodes are formed of transparent conductive oxide.

Liquid crystal matrix displays formed in accordance with the invention are simple in construction and possess pixels having superior electrical isolation, programmable threshold voltages, faster rise times and sharper currrent-voltage characteristics. The threshold voltages of the isolating switches may be programmed either before or after the display is assembled.

BRIEF DESCRIPTION OF THE DRAWINGS

In the drawings, which form an integral part of the specification and are to be read in conjunction therewith, and in which like reference numerals are employed to designate similar components in the various views.

It is to be understood that the subject matter illustrated in the Figures is not necessarily portrayed to scale, and that the relative scale of certain components is exaggerated in some instances to aid in a clear understanding of the invention.

DETAILED DESCRIPTION OF THE PREFERRED EMBODIMENTS

Figure 1:
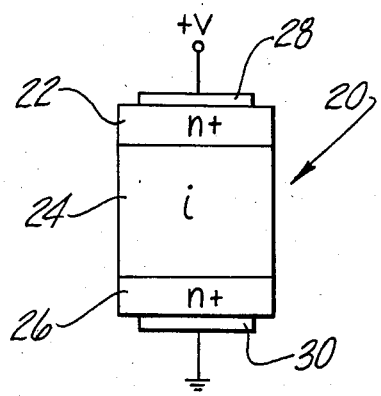
FIG. 1 is a diagrammatic view of a programmable switch which forms the preferred embodiment of the present invention.

Reference is first made to FIG. 1 wherein the basic structure of a programmable switch 20 according to the preferred form of the present invention is diagrammatically depicted. The switch 20 comprises a layer of intrinsic semiconductor material 24 sandwiched between two n+-type semiconductor contact layers 22 and 26 respectively. Suitable metal conductors 28 and 30 are respectively deposited on the n+ layers 22 and 26 and a source of voltage V is applied to the switch 20 through the conductors 28, 30.

The semiconductor layers 22, 24 and 26 are deposited, disordered materials such as deposited, amorphous silicon alloy materials formed by the plasma-assisted chemical vapor deposition of silane, or hydrogen and silicon tetrafluoride (SiF$_4$), and in the case of the n+ layers 22, 26, phosphine, silane and silicon tetrafluoride SiF$_4$ gas. Layers 22-26 may be deposited, for example, in the manner described in U.S. Pat. No. 4,217,374 to S. R. Ovshinsky et al for "Amorphous Semiconductors Equivalent to Crystalline Semiconductors", and U.S. Pat. No. 4,226,898 to S. R. Ovshinsky et al for "Amorphous Semiconductors Prepared by Glow Discharge Process", the disclosures of both of which patents are incorporated herein by reference. "Amorphous semiconductor materials" as used herein are defined as materials or alloys which, while they may have short or intermediate range order or even contain, at times, crystallaine inclusions, are characterized by long-range disorder. More commonly, the amorphous semiconductor materials are amorphous semiconductor alloy materials, such as amorphous silicon alloy materials and amorphous germanium alloy materials, having a density of states reducing element or elements incorporated therein, e.g. hydrogen or fluorine, or both hydrogen and flurorine. Methods of forming and depositing the layers 22-26 will be discussed later in more detail.

The undoped intrinsic i layer 24 is a slightly n-type and preferably comprises amorphous hydrogenated silicon (a-Si:H) or fluorinated amorphous silicon (a-Si:F:H). The characteristics of the amorphous semiconductor i layer 24 are controlled by its density of states in the band gap thereof. These states act as traps.

Due to the high resistivity of the i layer 24 and the electron injecting ohmic contacts, the conduction through the i layer 24 is space-charge-limited (SCL). In a material having an injecting contact, SCL currents occur when the dielectric relaxation time of the material exceeds the transit time to an opposite electrode. The carriers are not relaxed to equilibrium before reaching the opposite electrode and an SCL current is produced which is significantly larger than the ohmic current. The SCL current in the switch 20 is controlled by deep traps in the i layer 24. The n+ layers 22,26 effectively act as infinite reservoirs of carriers so that the current flow is determined and limited by the bulk of the i material at any applied voltage, the voltage drop over the n+ contacts being negligible.

Upon application of voltage to the switch 20, the injected charge is substantially uniformly distributed throughout the i layer and resides predominantly in deep traps. Upon reduction of the voltage, carriers are released from the traps with the passage of time and are refilled with the application of positive or negative voltage. The thermal release time T(E) of electrons at an energy E from the traps is given by the equation:

$$\tau(E) = \nu^{-1} \exp\left(\frac{E_c - E}{kT}\right)$$

where $\nu$ (approximately $10^{11}$ Hz) is an attempt to escape frequency which is assumed to be independent of energy E, $E_c$ is the energy level of the conduction band mobility edge, k is Boltzmann's constant and T is the temperature in degreesf Kelvin. When the voltage is reduced at a rate much faster than the release date of electrons from the traps, an excess space charge exists. This excess space charge builds up a potential barrier which decreases in time but which suppresses the entrance of electrons from the n+ layers.

After an instantaneous increase in the applied voltage, a high transient current occurs which can exceed the steady state current by more than one order of magnitude. This is due to the redistribution of free and trapped charges during the establishment of a new quasi-fermi level.

Both of these transient effects are due to a difference in operating frequency and strongly enhance the nonlinearity of the current-voltage characteristics at higher frequencies, under both forward and reverse bias. This enhancement may be seen in the characteristic curves shown in FIG. 2, wherein curve 32 is the characteristic of the switch 20 under DC excitation and curve 34 is the characteristic under AC excitation. The AC and DC curves may be seen to intersect each other at 36; at voltages below the intersection point 36, the first transient effect described above dominates. The AC current is reduced by the potential barrier created by the remaining space charge in the device 20, due to the higher operating frequency. The nonlinearity, and thus the threshold voltage of the switch 20 is increased as the frequency of the AC signal is increased.

Figure 2:
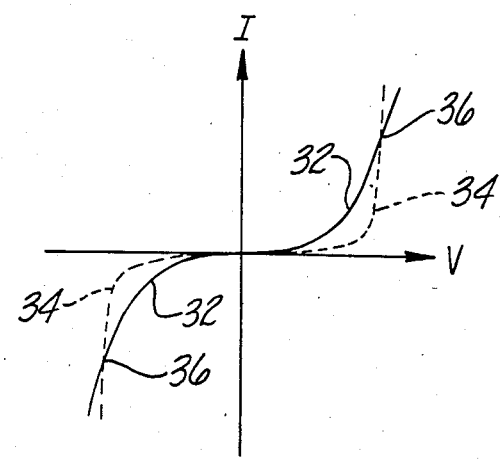
FIG. 2 is a graph of the AC and DC current-voltage characteristics of the programmable switch shown in FIG. 1.

Also apparent from FIG. 2 is the fact that both the AC and DC characteristics of the switch 20 are substantially symmetrical. As used herein, "substantially symmetrical I-V characteristics" means that the polarity applied to the switch 20 can be reversed without permanent breakdown, and that while the absolute values of the forward and reverse threshold voltages may differ from each other by several volts, both are sufficiently high in absolute value to render the switch 20 suitable for applications requiring symmetry. Moreover, the forward and reverse characteristics need not be identical in shape, but both have a relatively high slope beyond the threshold voltage value, where the slope is defined as the instantaneous change in voltage divided by the instantaneous change in current.

The duration of the transient effects is approximately in the range of milliseconds to several seconds. Frequencies up to the megahertz range are presently believed to be feasible.

The current-voltage characteristics of the switch 20 are influenced by the thickness of the intrinsic layer 24, exposure to heat between approximately 150° and 200° C. and exposure to certain radiation, especially light in the visible wavelength range.

High intensity illumination results in metastable changes in the amorphous semiconductor alloy forming the i layer 24 (the so-called Staebler-Wronski effect), which leads to a change in the conductivity of the material. Following the illumination, the original state of the material can be restored by annealing at 200° C. for approximately ½ hour. The effect is reversible and the cycle of annealing and illumination ("light soaking") can be repeated indefinitely.

It should be noted here that other combinations of sandwich layers may be employed such as a p-i-p, however, the n+-i-n+ combination described above is most desirable because it yields maximum nonlinearity of the current-voltage characteristics. It is also important to appreciate that certain metals such as magnesium may be employed as contacts for injecting majority charge carriers, rather than the n+ layers shown in FIG. 1, however it is necessary that such metal possess a work function sufficiently low such that it forms an ohmic contact with the i layer. In the case of magnesium for example, the work function is approximately 3.6 eV.

Single carrier SCL conduction occurs only in structures in which one contact is injecting for one type carrier and the other contact is highly blocking for the opposite type of carrier. In practice, this means the contacts are of the same type since contacts which are injecting for one type of carrier are usually also blocking for the opposite type of carrier.

Figure 3:
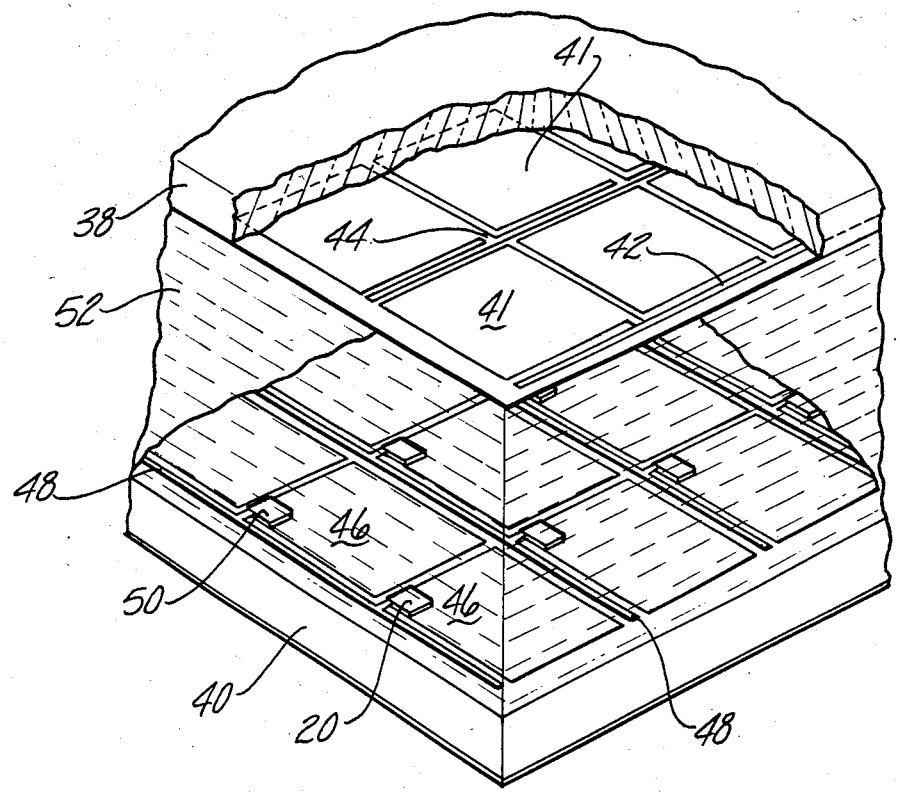
FIG. 3 is a fragmentary, upper perspective view of one corner of a liquid crystal display employing the programmable switch of FIG. 1 as an isolating device, parts of the upper plate being broken away in section to reveal the upper electrodes and column address lines.

Before describing several novel methods of producing the switch 20, one application of the switch 20 for use in a display assembly will now be discussed and in this connection reference is made to FIG. 3. The display shown in FIG. 3 is of the liquid crystal type in which a layer or film of liquid crystal material 52 is sandwiched between two parallel, transparent glass plates 38, 40 which are spaced apart between 5 and 50 microns and are sealed along their peripheries to permanently contain the liquid crystal material 52. The liquid crystal material 52 is a rigid, polar, organic material which is optically switchable upon the application of an electric field thereto to transmit or scatter polarized light, depending upon the species of crystals which are employed.

The display is oriented such that light rays indicated at 25 pass through one of the plates 38 (hereinafter referred to as the upper plate) and through the liquid crystal material 52. The display may include one or more polarizing layers (not shown) of conventional design to polarize the incident light 25 passing through the upper plate 38. The opposing faces of the upper and lower plates 38, 40 are respectively provided with substantially square, flat electrodes 41, 46, which are arranged into X rows and Y columns of opposing pairs thereof. Each pair of electrodes 41, 46 in combination with the liquid crystal material 52 therebetween, form a discrete pixel which may be individually addressed in order to display data, as will be discussed later.

The upper electrodes 41 are connected to a plurality of column addressing lines 42 by means of interconnects 44. Electrodes 41, column address lines 42 and interconnects 44 are formed of transparent, conductive material (TCO) such as vapor deposited indium oxide, indium tin oxide, antimony doped indium oxide, or the like and may be from 0.5 to approximately 20 microns thick. Electrodes 41 and 46 may typically range from 0.1 to 2 mm on each side. Alternatively, rather than employing discrete upper electrodes 41, such electrodes can be defined by continuous, parallel strips of TCO, each having a width substantially the same as the corresponding columns of lower electrodes 46.

It should be noted here that either of the opposing faces of the glass plates 38, 40 may be treated in a manner to produce parallel or perpendicular alignment of the liquid crystal molecules near the surfaces of the plates 38, 40. The plates 38, 40 may be treated to achieve perpendicular alignment by chemical etching, lecithin coatings, polyimide resins such as "Versamid", tertiary amides, quantary ammonium salts, pyridium salts and the like while surface abrasion of the plates 38, 40 can be resorted to in order to provide parallel alignment of the molecules. As will be discussed later in more detail, the lower electrodes 46 may be formed of reflective metal such as vapor deposited aluminum or chromium, or may consist of a transparent conductive oxide depending upon the type of liquid crystals which are employed and whether the display is to be of the "reflection" or "transmission" type.

Each of the lower electrodes 46 has formed in one corner thereof, one of the programmable switches 20 hereinbefore described, which permits programming the threshold voltage at which the corresponding pixel is switched, thereby effectively isolating each pixel from the effects of electrical cross-talk. The programmable switches 20 associated with the rows of the electrodes 46 are coupled by interconnects 50 to row addressing lines 48 which extend perpendicular to the column addressing lines 42. Each side of the programmable switches 20 is typically 10 to 50 microns in length, and the ratio of the surface area of the electrode 46 to that of the corresponding switch 20 is as large as possible, preferably at least 10 to 1. The switches 20 need not be positioned within the boundaries of the associated electrodes 46; however the illustrated configuration is preferred since it minimizes the wasted space between adjacent electrodes 46 (and pixels) and therefore maximizes the surface area of the pixels which can be contained in a display of given dimensions.

In operation, light rays 25 passing through the upper glass plate 38 pass through or are scattered by the liquid crystal material 52 between each pixel electrode pair, depending upon the strength of the electric field between electrodes 41, 46 of the pixel. Light transmitted through the film of liquid crystal material 52 is reflected upwardly back through the upper plate 38 if the lower plate 40 is provided with a layer of reflective material, or is transmitted through the lower plate 40 if the lower electrodes 46 are formed of a transparent conductive oxide. The particular embodiment shown in FIG. 3 is a reflective type liquid crystal display having an opaque covering 54 on the bottom of the lower glass plate 40, the electrodes 46 being formed of a reflective metal.

Figure 4:
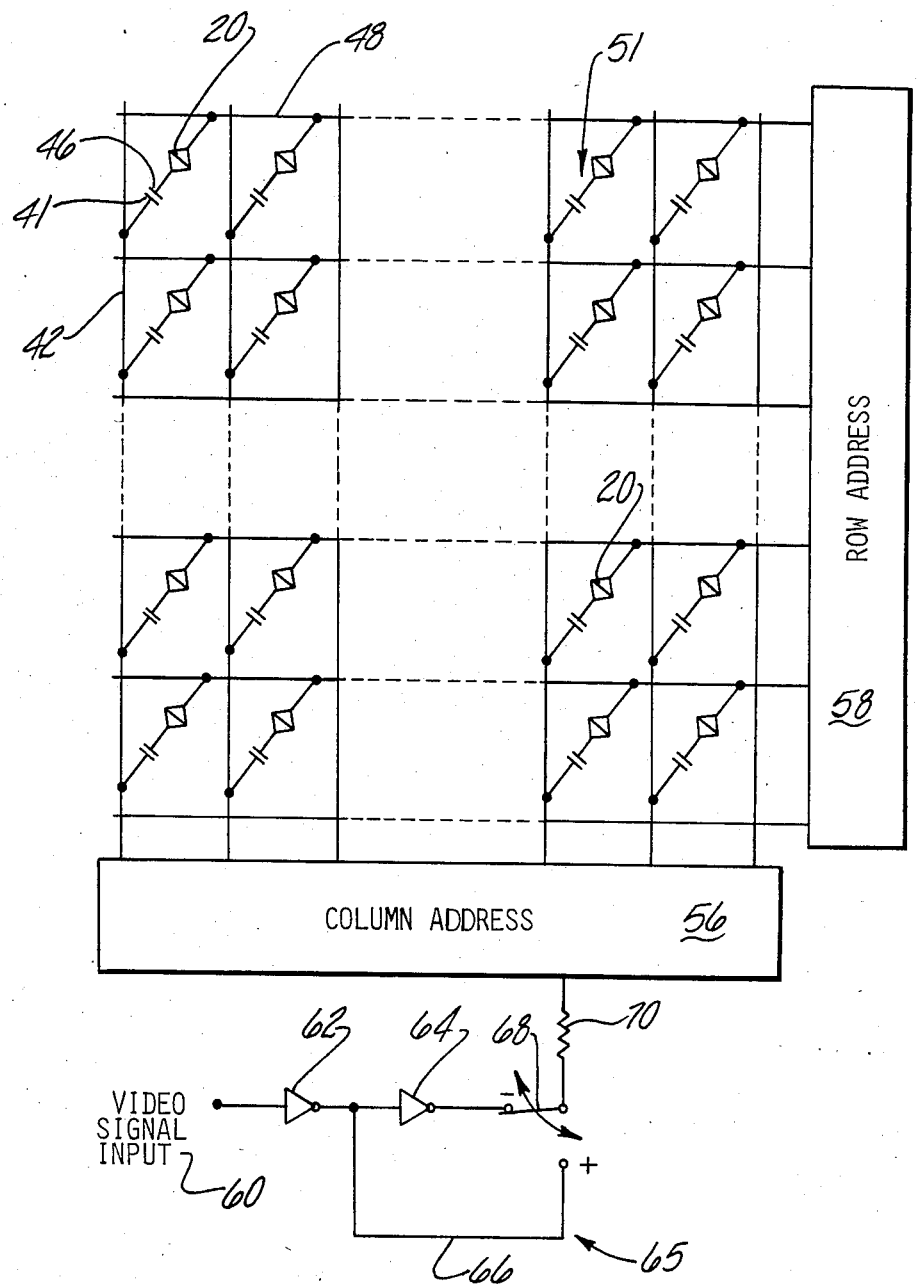
FIG. 4 is a combined block and schematic diagram of the display shown in FIG. 3.

Reference is now made to FIG. 4 which depicts a schematic circuit diagram of the liquid crystal display shown in FIG. 3, including means for addressing each of the pixels and means for periodically reversing the field applied to the liquid crystal material 52. Each pixel, generally indicated at 51, includes a series circuit connected between associated column and row addressing lines 42, 48 which comprises a programmable switch 20 and electrodes 41, 46. The programmable switches 20 function as nonlinear impedances upon application of either positive or negative voltage to the corresponding series circuit. If the voltage applied to the series circuit through address lines 42, 48 is less than the threshold voltage of the switch 20, the switch 20 functions essentially as a blocking diode to prevent current flow through the circuit. The threshold voltage of the switches 20 may be programmed, as will be discussed hereinbelow, and is sufficiently high to prevent current flow through the circuit resulting from crosstalk in the addressing circuitry or from parasitic capacitance between the circuit elements. The forward and reverse threshold voltages of the switches 20 are programmed to substantially the same value which typically may be from 5 to 15 volts and from −5 to −15 volts respectively.

Scanning of the M×N matrix of pixels 51 is performed using conventional column and row addressing circuits 56 and 58 respectively. As employed herein, the term "scanning" is defined as selective addressing of specific pixels. By way of example, scanning of the matrix may be accomplished by successively addressing each of the row address lines 48 while simultaneously applying data signals to all of the column addressing lines 42. Assuming for example that the display has 500 rows of pixels and a frame time of 33 milliseconds, each row is scanned in approximately 66 microseconds.

A source of video signal data 60 derived from a video data memory (not shown) or the like is delivered to a video signal input terminal 60 which is coupled to the column address circuit 56 by means generally indicated at 65 for periodically reversing the polarity of the addressing signals. As previously mentioned, polarity reversal is necessary to periodically reverse the electric field applied to the liquid crystal material in order to prevent degradation thereof. The video signals are delivered through a first inverter 62 to the input of the second inverter 64 and to a positive terminal of a switch 68 via line 66. Inverter 64 inverts the signal received at its input and delivers the inverted signal to the negative terminal of switch 68. The switch 68 alternately connects the addressing circuitry 56 through a current limiting resistor 70 to the positive and negative switching terminals. Switch 68 may comprise any suitable bistate electronic circuit for effecting polarity reversal on a periodic basis.

As previously mentioned, each of the programmable switches 20 has nonlinear, substantially symmetrical current-voltage characteristics, and therefore allows current conduction through the associated series circuit when the level of the address signal exceeds the threshold voltage of the switch 20. This threshold voltage is programmed at a level which effectively isolates the associated pixel 51 from crosstalk, or spurious signals, including the effects of parasitic capacitance between adjacent pixels 51.

The voltage applied to the series circuit containing a pixel 51 to be energized comprises the sum of the scanning voltage applied by the row address circuit 58 and the voltage of the data signal applied to the corresponding pixel column by the column address circuit 56.

Reference is now made to FIGS. 5-8 which depict the construction of the programmable switches 20 in more detail, as well as the steps employed to manufacture the switches 20. It is to be understood that although the switch 20 has been illustrated in the drawings in combination with a liquid crystal display, the switch 20 and method for making same may be advantageously employed in numerous types of displays and other applications.

The first step in the manufacturing method consists of vapor depositing a layer of transparent conductive oxide (TCO) 72 on the upper face of the lower glass plate 40. The TCO layer 72, which forms a bottom conductor, preferably possesses a sheet resistance of approximately 20 ohms per square and may comprise 1000 to 10,000 angstroms of indium oxide, indium tin oxide, antimony doped indium oxide or the like. Next, a relatively thin layer 74 of protective metal such as chromium is deposited on the TCO 72. The chromium layer 74 should be sufficiently thin to allow at least approximately 50% or more transmission of visible light therethrough, e.g. a layer having a thickness of approximately 70 angstroms. The thickness of layer 74 will vary according to the particular type of metal employed in order to achieve 50% transmission.

As disclosed in copending U.S. application Ser. No. 573,004 filed Jan. 23, 1984 for Liquid Crystal Display Operated By Amorphous Silicon Alloy Diodes, a sandwich of semiconductor layers, and in accordance with this embodiment, of n+-i-n+ layers is then deposited on top of the chromium layer 74, each of the n+ layers 22, 26 being approximately 100 to 1,000 angstroms in thickness and the i layer 24 beng between 3,000 and about 20,000 angstroms thick. A relatively thick layer 76 (on the order of 1000 angstroms) of a protective, conductive metal such as molybdenum-tantalum (MoTa) or aluminum is deposited on top of the upper n+ layer 22. The metal layer 76 may be deposited by conventional sputtering techniques; however it is believed that sputtering of the MoTa or Al may result in introducing inclusions into the i layer 24 which effectively lowers the forward current and raises the reverse current of the switch 20. Accordingly, the metal layer 76 is preferably deposited by electron beam evaporation of chromium, or by other evaporation methods.

Figure 6:
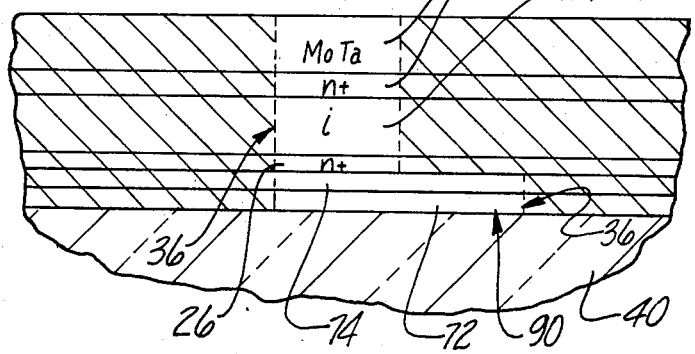
FIGS. 6-8 depict the programmable switch at several successive stages of fabrication in accordance with a method of making the switch.

The deposition steps described immediately above result in a sandwich of layers as depicted in FIG. 6. The sandwiched layers shown in FIG. 6 are then subjected to a plasma at 200° C. or less in order to etch away unwanted portions of the materials and thereby define both the body of the switch 20 indicated by the dotted line 36 in FIG. 6, as well as the address lines 48. The metal layer 76 protects the n+ layer 22 during this etching step. Similarly, the chromium layer 74 protects a laterally extending portion 90 of the TCO 72 during the plasma etching.

Figure 7:
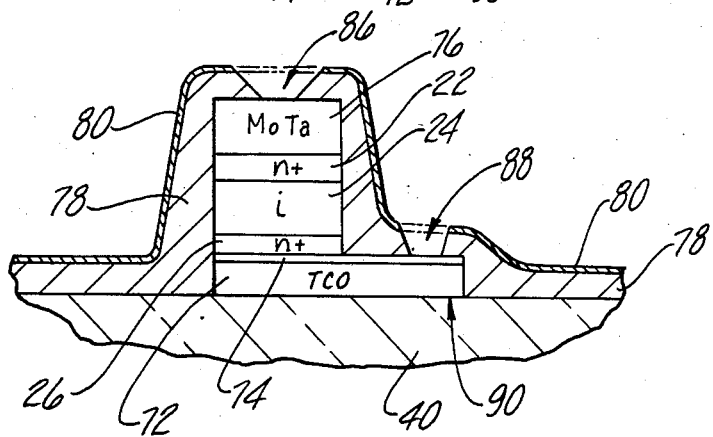

Following the etching step, as shown in FIG. 7, a relatively thick coating 78 of insulating field oxide, such as SiO$_2$ is deposited followed by the deposition of a layer 80 of opaque passivation such as black polyimide. The black polyimide layer 80 is deposited at approximately 220° C., and the switch 20 is baked at this temperature for approximately 10 minutes in order to reduce the threshold voltage of the switch 20 and possibly increase the symmetry of its current-voltage characteristics.

A pair of vias 86, 88 are etched through the oxide 78 and polyimide 80 in order to expose the MoTa layer 76 and chromium layer 74.

Following the opening of the vias 86, 88, a layer 82 of reflective, conductive metal such as chromium or aluminum is vapor deposited onto the passivation layer 80.

Figure 5:
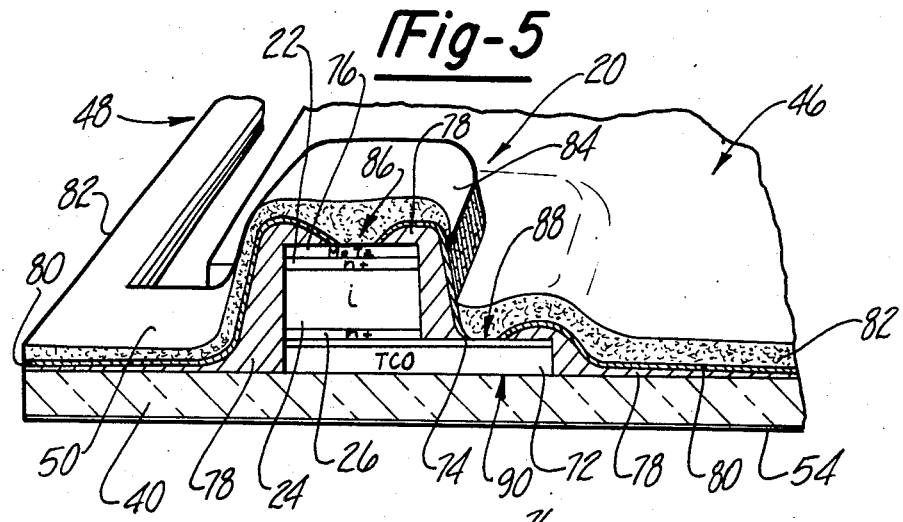
FIG. 5 is a fragmentary, upper perspective view showing a portion of one of the pixels of the display depicted in FIG. 3, parts of the isolating switches being broken away in cross-section.
Figure 8:
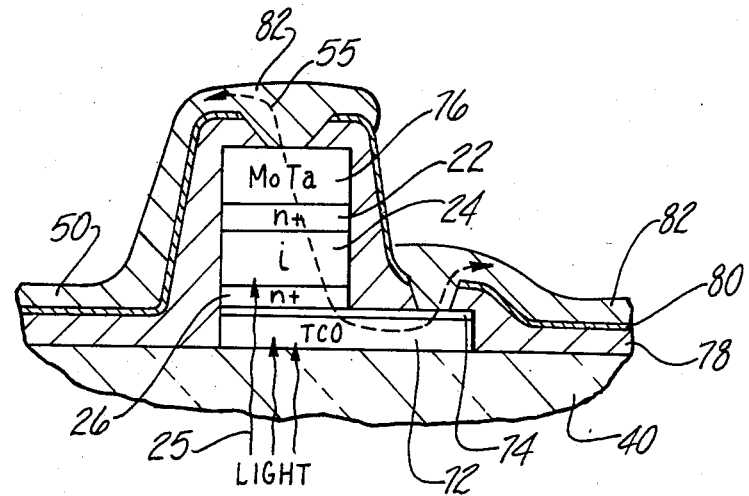

As best seen in FIG. 8, the conductive layer 82 fills each of the vias 86, 88, thereby connecting the device 20 in series relationship between the address line 48 and electrodes 46, and completes a current path 55 (FIG. 8) through the various conductive layers of the switch 20. As best seen in FIG. 5, the deposition of the upper metal layer 82 forms both the lower electrodes 46, the address lines 48 and interconnects 50.

At this point, it may be appreciated that the $n^{30}$-i-n+ sandwich is completely sealed and shielded from light around its sides and top by virtue of the black polyimide passivation 80 and upper metalization 82; however the bottom of the n+-i-n+ sandwich remains open to radiation exposure through the TCO 72. The threshold voltage of the device 20 is programmed by directing radiation through the bottom of the glass plate 40 toward the i layer 24. The radiation must have photon energies so as to be absorbed by the i material, consequently visible light, for example, would be suitable for this purpose. Accordingly, a relatively intense beam of visible light is directed through the bottom of the glass plate 40 thereby increasing the density of states in the i material until the threshold voltage is increased to a preselected value. The threshold voltage may be monitored during the exposure process by measuring the current flow through the device 20. When the preselected threshold value is reached, the radiation exposure is terminated and the open path for light through the bottom of the switch 20 is sealed off by applying an opaque coating 54 (FIG. 5) on the bottom of the glass plate 40. The coating 54 consists of any suitable material, such as paint or CdTe, which absorbs any radiation which might change the threshold voltage of the device 20 or promote leakage currents therein due to photo conductivity of the i layer, and may be applied by spraying or the like. The coating 54, passivation 80 and metalization 82 form a radiation shield which completely envelops the radiation sensitive i layer 24, thus preventing degradation of the i layer 24 (and related alteration of the threshold voltage) due to stray or ambient radiation especially in the visible wavelength range. The switch 20 having been programmed and sealed, the display may then be assembled by introducing the liquid crystal material 52 between plates 38, 40 and thereafter sealing the assembly.

It should be noted here that the programming step may also be performed prior to applying the metalization 82 if desired. Also, in the event that the i layer 24 is overexposed during the programming process such that the threshold voltage exceeds the preselected value, the switch 20 may be simply reprogrammed by fully or partially annealing it at between 150° and 200° C. As previously mentioned, the annealing process reverses the Staebler-Wronski effect and reduces the threshold voltage to a value below the preselected value, thus readying the device 20 for reprogramming by "light soaking".

It should be also noted that the switches 20 may be programmed by first light soaking them so that the threshold exceeds the desired value followed by annealing them until the desired threshold value is reached.

Figure 9:
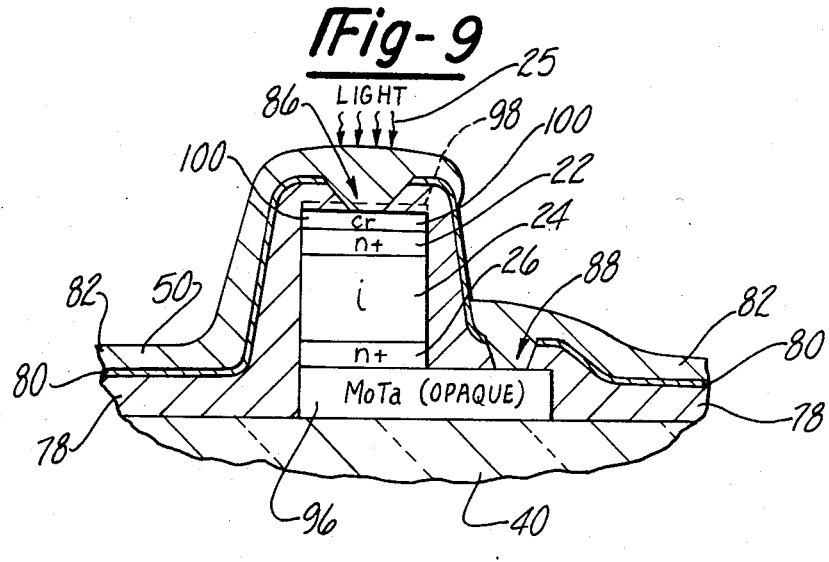
FIG. 9 is a cross-sectional view of an alternate form of the programmable switch; and, FIG. 10 is a cross-sectional view of another form of the programmable switch for use in transmission-type displays.

Reference is now made to FIG. 9 where another form of the switch 20 is depicted which may be programmed using a source of radiation positioned above, rather than below the glass plate 40. The switch shown in FIG. 9 is manufactured by first depositing a relatively thick, opaque layer of conductive metal such as MoTa or aluminum on the lower glass plate 40, followed by deposition of the n+-i-n+ sandwich. A layer 100 of chromium is then evaporated onto the n+ layer 22. The chromium layer 100 may be up to 70 angstroms thick so as to allow transmission of a substantial portion, e.g. 50%, of the radiation which is later applied in programming switch 20. A final top layer 98 of protective metal, such as MoTa or aluminum is then deposited on top of the chromium layer 100 in order to protect the n+-i-n+ sandwich during subsequent plasma etching.

The body of the switch 20 is defined by plasma etching, as previously described, which substantially removes the top layer 98 of metal. Following plasma etching, a layer 78 of a field oxide such as $SiO_2$ and black polyimide 80 are deposited, after which vias 86, 88 are opened as previously described. The via 86 exposes the partially transmissive chromium layer 100, thus providing a path to the i layer 24 for the programming light.

The i layer 24 is "soaked" with programming light until the desired threshold voltage is reached, following which the metalization 82 is applied which closes the vias 86, 88 thereby sealing the path through which the i layer 24 is programmed with light. The black polyimide coating 80 seals the sides of the device and the MoTa layer 96 seals the bottom of the device from stray or ambient light.

Figure 10:
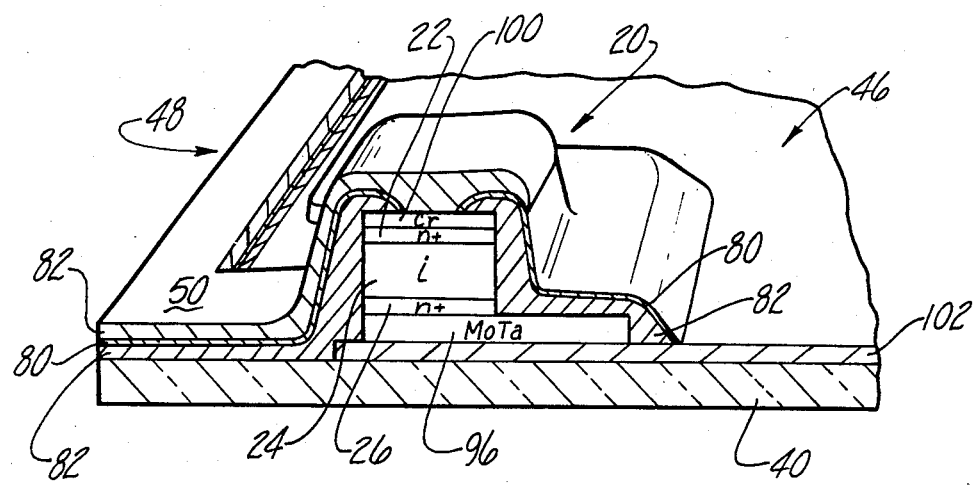

The displays hereinabove described are of the "reflective" type in which the lower electrode 46 is formed of reflective metal. Another alternate embodiment is depicted in FIG. 10 which is suitable for use in a "transmission" type display. The display depicted in FIG. 10 is formed by first depositing on the lower glass plate 40 a layer 102 of TCO of the type previously mentioned, which is between 0.5 and 20 microns thick. Next, the TCO 102 is etched to define the geometry of the electrodes 46. This etching step also removes those portions of the TCO 102 beneath the address lines 48 and interconnects 50. A mask is then applied on the TCO layer 102 which covers the electrode 46. The remaining processing steps are identical to those discussed with respect to the embodiment shown in FIG. 9. Following application of the final metalization layer 82, the mask is removed. As shown in FIG. 10, the black polyimide coating 80 covers the area immediately surrounding the device 20; however, the remaining area of the electrode 46 is transparent, thus allowing transmission of light through the TCO 102 and bottom plate 40. The construction shown in FIG. 10 is typically employed in applications where the liquid crystal display is "backlighted", however various other applications may employ the construction shown in FIG. 10.

From the foregoing, it is apparent that the programmable switch and method for making same may be employed in a variety of applications including those related to displays, and especially, liquid crystal displays. It is recognized, of course, that those skilled in the art may make various modifications or additions to the preferred embodiment chosen to illustrate the invention without departing from the spirit and scope of the present contribution to the art. Accordingly, it is to be understood that the protection sought and to be afforded hereby should be deemed to extend to the subject matter claimed and all equivalents thereof fairly within the scope of the invention.

What is claimed is:

1. A display of the type including a plurality of addressable pixels, comprising:

a plurality of electrical switchable pixels each having an addressable electrode;

address means for addressing each of said electrodes;

switch means associated with one of said pixels and connected in a circuit with said address means and the addressable electrode associated with said one pixel for switching said one pixel, said switch means including means responsive to optical radiation for programming a threshold voltage at which said switching means conducts current between said addressing means and said one pixel; and means for shielding said radiation responsive means from ambient radiation after said threshold voltage has been programmed, whereby to prevent alteration of said threshold voltage by said ambient radiation.

2. The display of claim 1, wherein said radiation responsive means includes a layer of an amorphous semiconductor material, and said switch means includes means, contacting said layer for injecting charge carriers into said layer.

3. The display of claim 2, wherein said amorphous semiconductor material is substantially intrinsic and said injecting means includes a doped semiconductor material.

4. The display of claim 2, wherein said injecting means is a metal having a relatively low work function.

5. The display of claim 4, wherein said metal is magnesium.

6. The display of claim 1, including a substrate, said electrodes and said switch means being disposed on said substrate.

7. The display of claim 6, wherein said address means includes a plurality of electrical address lines above said substrate for delivering addressing signals to respectively associated groups of said pixels, and means above said substrate for electrically interconnecting one of said addressing lines with said switch means.

8. The display of claim 1, wherein said switch means is disposed on the addressable electrode associated with said one pixel.

9. The display of claim 1, wherein:

said electrodes are arranged in a planar matrix array of M rows and N columns, said address means includes M addressing lines for respectively addressing said rows of said electrodes and N addressing lines for respectively addressing said columns of electrodes, and said display including a plurality of said switch means, with one such switch means being associated with each pixel, and means for connecting each of said pixels and its associated switch means in series with each other between a corresponding pair of said M and N addressing lines.

10. The display of claim 9, wherein:

each of said pixels includes a quantity of liquid crystal material under the control of the corresponding electrode, and means connected with said address lines for applying a voltage to said electrodes and for periodically reversing the polarity of said voltage whereby to prevent degradation of said liquid crystal material.

11. The display of claim 1, wherein said switch means includes non-single-crystal semiconductor material having bulk properties providing nonlinear current-voltage characteristics, a first conductor electrically connected with the addressable electrode of said one pixel, and a second conductor electrically connected with said address means, said radiation responsive means being sandwiched between said first and second conductors.

12. The display of claim 11, wherein each of said switches includes means contacting said amorphous semiconductor material for injecting charge carriers into said amorphous semiconductor material.

13. The display of claim 11, wherein said semiconductor material is substantially intrinsic amorphous semiconductor material and said injecting means includes a pair of layers of n+ semiconductor material, the intrinsic and n+ materials being layered in an n+-i-n+ configuration.

14. The display of claim 11, wherein said amorphous semiconductor material is substantially intrinsic and said injecting means includes a pair of layers of p+ semiconductor material, the intrinsic and p+ materials being layered in an p+-i-p+ configuration.

15. The display of claim 3, wherein said doped semiconductor material is of n conductivity type.

16. The display of claim 3, wherein said doped semiconductor material is of p conductivity type.

17. The display of claim 1, wherein said switches associated with each of said pixels have nonlinear current-voltage characteristics and are operable in a space charge limited conduction regime.

18. The display of claim 1, wherein said means responsive to optical radiation includes a region of non-single-crystal semiconductor material having a selected density of states in the band gap thereof and deep traps, and wherein said threshold voltage is alterable in response to exposure of said semiconductor material to said optical radiation.

19. The display of claim 18, wherein said semiconductor material is pre-exposed to a selected quantity of said radiation to pre-program said threshold voltage.

20. The display of claim 18, wherein said non-single-crystal semiconductor material is amorphous semiconductor material.

21. The display of claim 20, wherein:

said switch means includes means contacting said region of amorphous semiconductor material for injecting charge carriers into said region; and said region of amorphous semiconductor material is intrinsic.

22. The display of claim 21, wherein each of said injecting means includes spaced first and second regions of extrinsically doped non-single-crystal semiconductor material.

23. The display of claim 21, wherein said amorphous semiconductor material includes hydrogenated silicon.

24. The display of claim 21, wherein said amorphous semiconductor material includes fluorinated silicon.

25. The display of claim 21, including a substrate which is substantially transparent to said optical radiation and said layer of amorphous semiconductor material and said injecting means is disposed on one side of said substrate.

26. The display of claim 25, wherein said shielding mean includes a coating of material on said one said of said substrate and covering said layer of amorphous semiconductor material, said coating of material being absorbent of said optical radiation.

27. The display of claim 26, wherein said shielding means includes a shield of material between said layer of amorphous semiconductor material and said one said of said substrate that is opaque to said optical radiation.

28. The display of claim 27, wherein said shield material is connected with said injecting means and is electrically conductive.

29. The display of claim 27, wherein said shield material is disposed on the other side of said substrate.

30. The display of claim 29, wherein said shield material is CdTe.

31. The semiconductor switch of claim 30, wherein said coating of material includes black polyimide.

32. The display of claim 21, including a layer of conductive metal covering said injecting means, said injecting means being disposed between said layer of conductive metal and said layer of amorphous semiconductor material, said layer of conductive metal being at least partially transparent to said optical radiation.

33. The display of claim 21, wherein said amorphous semiconductor material includes hydrogenated germanium.

34. The display of claim 21, wherein said amorphous semiconductor material includes fluorinated germanium.

* * * * *